United States Patent
Anno et al.

(10) Patent No.: US 7,010,799 B2
(45) Date of Patent: Mar. 7, 2006

(54) RECORDING AND/OR REPRODUCING APPARATUS

(75) Inventors: Ryosuke Anno, Saitama (JP); Kazuhito Kurita, Kanagawa (JP); Tokio Kanada, Kanagawa (JP); Mikinori Matsuda, Kanagawa (JP); Tadami Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 10/442,961

(22) Filed: May 22, 2003

(65) Prior Publication Data

US 2004/0013073 A1    Jan. 22, 2004

(30) Foreign Application Priority Data

Jun. 3, 2002   (JP) .............................. 2002-161910

(51) Int. Cl.
*G11B 23/107* (2006.01)

(52) U.S. Cl. ....................................... 720/634; 720/652
(58) Field of Classification Search ................ 720/634, 720/632, 630, 652, 619
See application file for complete search history.

(56) References Cited

U.S. PATENT DOCUMENTS

| | | | | |
|---|---|---|---|---|
| 5,301,179 A | * | 4/1994 | Okamoto | 720/636 |
| 6,324,153 B1 | * | 11/2001 | Furukawa et al. | 720/694 |
| 6,807,670 B1 | * | 10/2004 | Ohtsuka | 720/672 |

FOREIGN PATENT DOCUMENTS

| | | | | |
|---|---|---|---|---|
| EP | 1067550 A1 | * | 1/2001 | |
| JP | 11176058 A | * | 7/1999 | |
| JP | 2000132959 A | * | 5/2000 | |
| JP | 2000339816 A | * | 12/2000 | |
| JP | 2000339920 A | * | 12/2000 | |
| JP | 2001035054 A | * | 2/2001 | |
| JP | 2002109809 A | * | 4/2002 | |

* cited by examiner

Primary Examiner—William J Klimowicz
(74) Attorney, Agent, or Firm—Oblon, Spivak, McClelland, Maier & Neustadt, P.C.

(57) ABSTRACT

A recording and/or reproducing apparatus includes a holder for holding an inserted recording medium, a recording and/or reproducing section for performing recording on or reproduction from the recording medium, a chassis in which the recording and/or reproducing section is provided, and a loading mechanism for moving the holder and the chassis closer to each other when the recording medium is inserted in the holder.

14 Claims, 4 Drawing Sheets

SLIDER MOVING DIRECTION

SLIDER MOVING DIRECTION

RECORDING AND/OR REPRODUCING APPARATUS

BACKGROUND OF THE INVENTION

1. Field of the Invention

The present invention relates to a recording and/or reproducing apparatus, and more particularly, to a recording and/or reproducing apparatus having a mechanism for loading a recording medium.

2. Description of the Related Art

Recording and/or reproducing apparatuses are known which record or reproduce information signals on or from an information-recording medium such as an optical disk or a magnetooptical disk. This type of a recording and/or reproducing apparatus includes a holder in which an information-recording medium is inserted and held, a rotating mechanism placed below the holder to rotate the information-recording medium held in the holder, an optical pickup for recording or reproducing information signals on or from the information-recording medium, a base chassis in which the rotating mechanism and the optical pickup are provided, and a loading mechanism for loading and unloading the information-recording medium.

In the recording and/or reproducing apparatus, when an information-recording medium is inserted into the holder from an insertion slot provided in an outer housing, the holder is moved down toward the base chassis having the rotating mechanism by the loading mechanism. Subsequently, the information-recording medium held in the holder is loaded on the rotating mechanism provided in the base chassis.

In such a recording and/or reproducing apparatus, a flexible circuit board and so on are arranged between the base chassis and a lower surface of the outer housing. One end of the flexible circuit board is connected to a circuit board which is placed on the lower surface of the outer housing and on which a driving circuit for the optical pickup, and so on are provided, and the other end thereof is connected to a pickup base of the optical pickup. When the optical pickup is moved in the radial direction of the information-recording medium, the flexible circuit board moves between the lower surface of the outer housing and the base chassis while bending. For this reason, it is necessary to form, between the outer housing and the base chassis, a predetermined clearance in which the flexible circuit board can move smoothly.

Such a clearance between the lower surface of the outer housing and the base chassis is provided as a space in which the flexible circuit board moves when the optical pickup moves in the radial direction of the information-recording medium. Therefore, when the information-recording medium is not loaded, it is satisfactory that the clearance is enough to store the flexible circuit board, and does not need to have a sufficient height for smooth movement of the flexible circuit board. For this reason, an unnecessary space is formed between the lower surface of the outer housing and the base chassis.

SUMMARY OF THE INVENTION

It is an object of the present invention to provide a recording and/or reproducing apparatus which resolves the above-mentioned problem.

According to the present invention, there is provided a recording and/or reproducing apparatus including a holder for holding an inserted recording medium, a recording and/or reproducing section for performing recording on or reproduction from the recording medium, a chassis in which the recording and/or reproducing section is provided, and a loading mechanism that moves the holder and the chassis closer to each other when the recording medium is inserted in the holder.

According to the present invention, there is provided a recording and/or reproducing apparatus including a holder disposed at a predetermined distance from an upper surface of a housing to hold an inserted recording medium, a recording and/or reproducing section for performing recording on or reproduction from the recording medium, a chassis which is disposed at a predetermined distance from a lower surface of the housing and in which the recording and/or reproducing section is provided, and a loading mechanism that moves the holder and the chassis closer to each other by separating the holder from the upper surface of the housing and separating the chassis from the lower surface of the housing when the recording medium is inserted in the holder.

DESCRIPTION OF THE PREFERRED EMBODIMENTS

Figure 1:
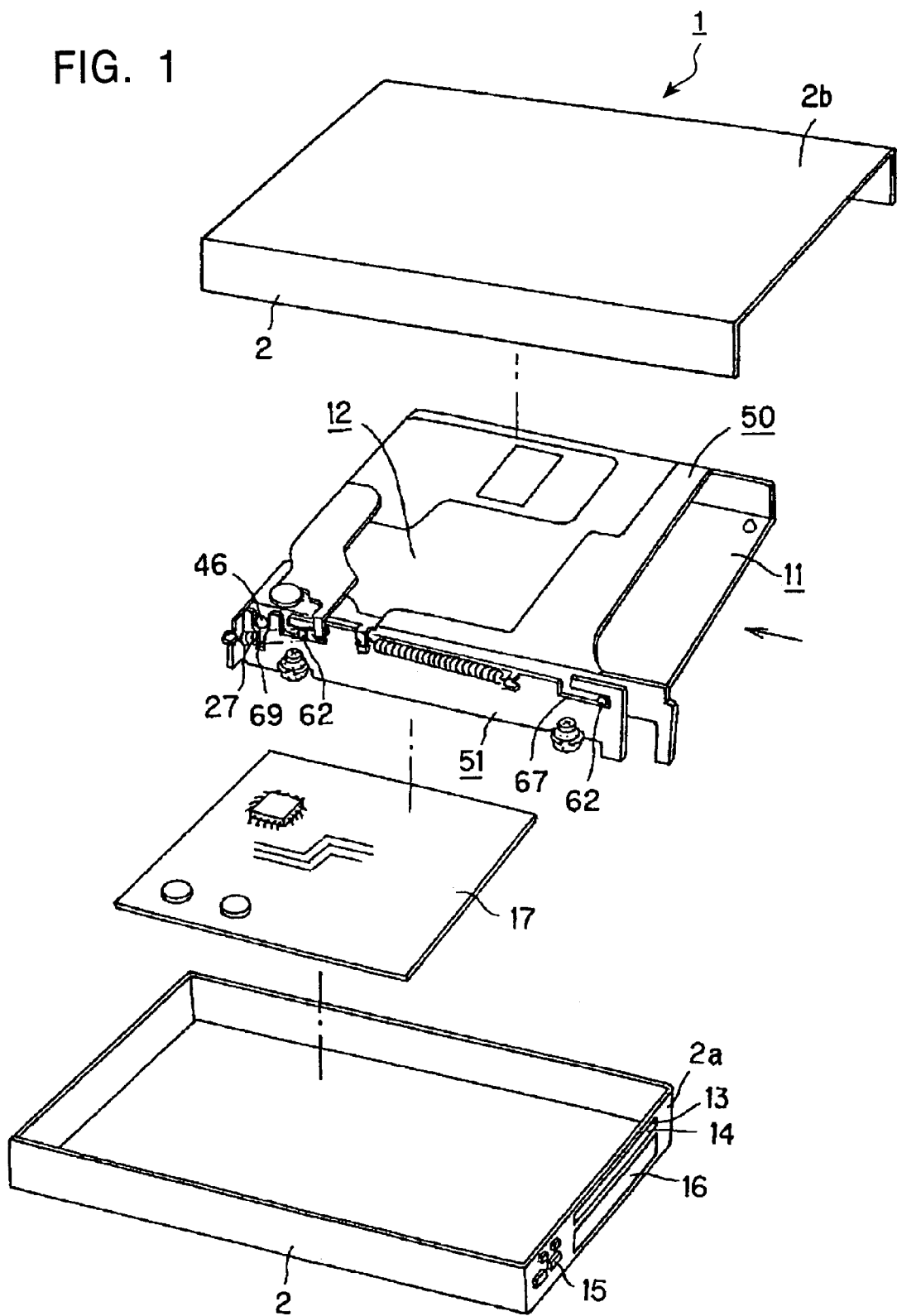
FIG. 1 is an external perspective view of a recording and/or reproducing apparatus to which the present invention is applied.

A recording and/or reproducing apparatus to which the present invention is applied will be described below with reference to the attached drawings. Referring to these figures, a recording and/or reproducing apparatus 1 includes a substantially rectangular outer housing 2, a loading mechanism 5 placed inside the outer housing 2 to load and unload an optical disk 3, such as a magnetooptical disk, inserted in a cartridge holder that constitutes an apparatus body, a rotating mechanism 6 for rotating the optical disk 3 conveyed onto a chassis 11 by the loading mechanism 5, and an optical pickup 7 for recording or reproducing an information signal onto or from the optical disk 3.

An optical disk 3 is loaded in the recording and/or reproducing apparatus 1 so that an information signal is recorded thereon or is reproduced therefrom. The optical disk 3 is formed by covering a disk substrate made of a light-transmissive material with a signal-recording layer made of a magnetooptical recording material. As shown in FIG. 2B, the optical disk 3 has a circular chucking hole 3a and a chucking plate 3b at its center. The optical disk 3 is centered about the chucking hole 3a by a frusto-conical projection formed on an upper surface of a disk table 30 that constitutes the disk rotating mechanism 6 which will be described later. Furthermore, the optical disk 3 is held on the disk table 30 while the chucking plate 3b is attracted by a magnet provided in the disk table.

Figure 2A:
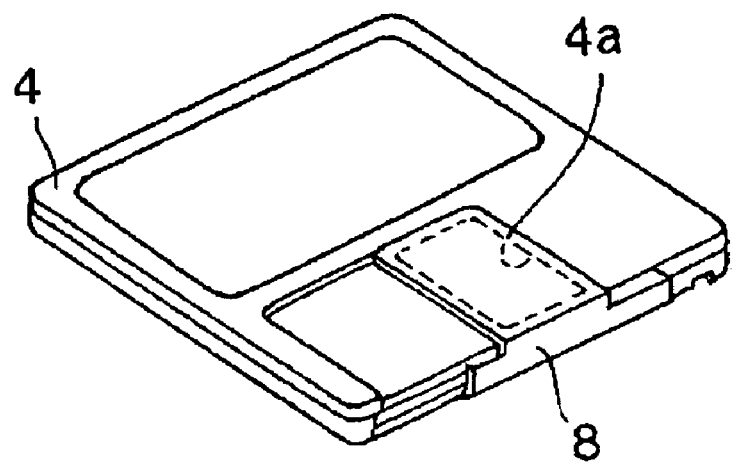
FIGS. 2A and 2B are perspective views of a disk cartridge used in the recording and/or reproducing apparatus.
Figure 2B:
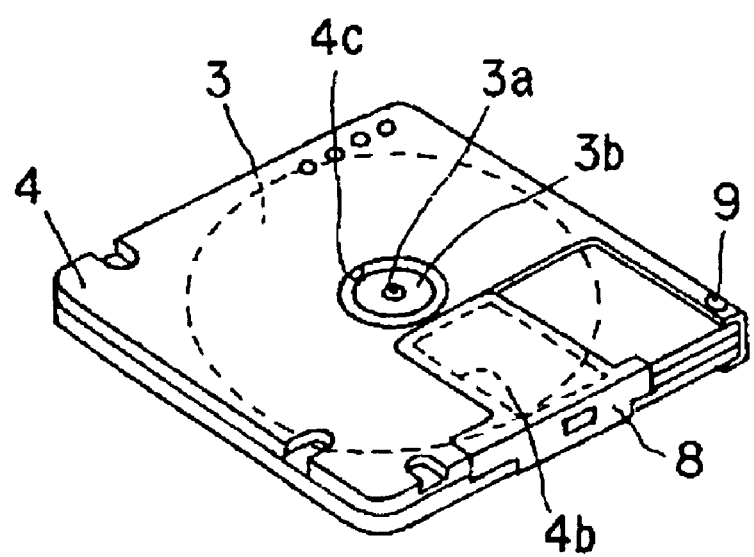

As shown in FIGS. 2A and 2B, the optical disk 3 is rotatably stored in a disk cartridge 4. The disk cartridge 4 is formed by a pair of substantially rectangular upper and lower halves butt-joined to each other. A magnetic-head aperture 4a is formed in an upper principal surface of the disk cartridge 4 so that a part of a signal-recording surface of the stored optical disk 3 can be exposed to the outside therefrom. An optical-pickup aperture 4b is formed in a position on a lower principal surface of the disk cartridge 4 corresponding to the magnetic-head aperture 4a. The magnetic-head aperture 4a and the optical-pickup aperture 4b are opened and closed by a shutter member 8. A chucking aperture 4c is also formed at almost the center of the lower principal surface of the disk cartridge 4 so that the chucking hole 3a of the optical disk 3 can be exposed to the outside therethrough.

Engaging holes 9 to engage with positioning projections formed on the chassis 11, which will be described later, are also formed in the lower principal surface of the disk cartridge 4.

Figure 3:
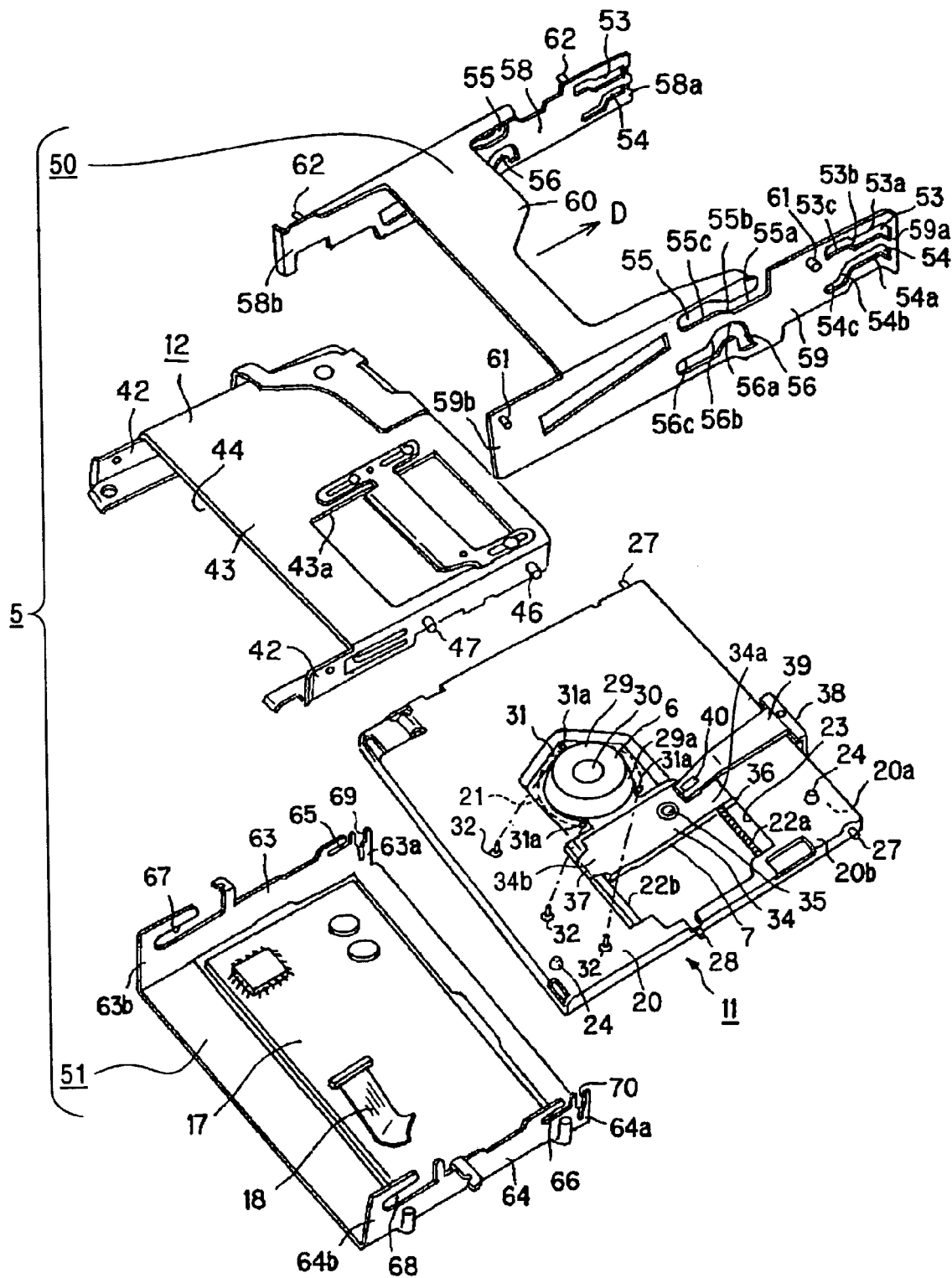
FIG. 3 is an exploded perspective view of the recording and/or reproducing apparatus.

The recording and/or reproducing apparatus 1 in which such a disk cartridge 4 is loaded has the chassis 11. In the chassis 11, the rotating mechanism 6, the optical pickup 7, and so on that constitute the apparatus body are placed, as shown in FIG. 3. A cartridge holder 12 for holding the optical disk 3 inserted in the outer housing 2, and the loading mechanism 5 for loading the disk cartridge 4 by moving the cartridge holder 12 holding the disk cartridge 4 and the chassis 11 having the optical pickup 7 are provided above the chassis 11.

As shown in FIG. 1, an opening 13 through which the disk cartridge 4 is inserted and ejected is formed in a front face 2a of the outer housing 2 in which the apparatus body is placed. The outer housing 2 also has a cover 14 that prevents dust or the like from entering the outer housing 2 from the opening 13. The cover 14 is constantly biased by a biasing member such as a helical torsion spring (not shown) to close the opening 13.

The outer housing 2 also has an operating section 15 in which control buttons and the like for operating the recording and/or reproducing apparatus 1 are arranged, and a display section 16 for displaying information recorded on the optical disk 3, and the like.

A circuit board 17 on which various electronic components, such as a controller, for controlling driving sections in the recording and/or reproducing apparatus 1 are mounted is placed on a lower surface of the outer housing 2. The circuit board 17 is connected to one end of a flexible circuit board 18 that is electrically connected to a pickup base 34 of the optical pickup 7 which will be described later.

The chassis 11 in which the disk-rotating mechanism 6 and the optical pickup 7 are placed is provided with a chassis base 20 shaped like a substantially rectangular plate, as shown in FIG. 3. The disk-rotating mechanism 6 for rotating the optical disk 3 is provided at almost the center of the chassis base 20. A driving motor that constitutes the disk-rotating mechanism 6 is placed on a bottom surface 20a of the chassis base 20. A disk table 30 of the disk-rotating mechanism 6 for rotatably holding the optical disk 3 projects from a circular aperture 21 formed at almost the center of the chassis base 20.

A pair of guide shafts 22a and 22b for guiding the movement of the optical pickup 7 extend on the bottom surface 20a of the chassis base 20 in the radial direction of the optical disk 3. A rectangular aperture 23 is formed in the chassis base 20 to be connected to the aperture 21. An objective lens 35 of the optical pickup 7 supported in the guide shafts 22a and 22b faces an upper surface 20b of the chassis base 20 through the rectangular aperture 23.

Positioning projections 24 are formed on the upper surface 20b of the chassis base 20 to position the disk cartridge 4 having the optical disk 3 therein.

Engaging projections 27 and 28 to be slidably engaged with guide grooves formed in a guide plate 51 and a slider 50, which will be described later, project from both side edges of the chassis base 20 in a direction orthogonal to the direction of insertion of the disk cartridge 4. By the guiding of the engaging projections 27 and 28 along the guide plate 51 and the slider 50, the chassis base 20 is moved closer to and away from the cartridge holder 12.

The disk-rotating mechanism 6 is provided at almost the center of the chassis base 20 to rotatably support the optical disk 3, and includes a spindle motor 29, and a disk table 30 on which the optical disk 3 is placed, as described above.

The disk table 30 is mounted at the leading end of a driving shaft of the spindle motor 29. A flange-shaped retaining portion 31 is formed at the lower end of a substantially cylindrical body portion 29a of the spindle motor 29. The retaining portion 31 has fitting holes 31a in which fixing members 32 are fitted to fix the spindle motor 29 to the upper surface 20b of the chassis base 20. The spindle motor 29 is placed in the aperture 21 formed in the upper surface 20b of the chassis base 20 in a state in which the retaining portion 31 is retained on the lower surface 20a. The spindle motor 29 is fixed to the chassis base 20 while the fitting holes 31a formed in the retaining portion 31 and connecting holes formed in the chassis base 20 are connected, and the fixing members 32 are fitted from the side of the lower surface 20a.

When the disk cartridge 4 is placed on the disk table 30, such a spindle motor 29 rotates the optical disk 3 at a CAV (Constant Angular Velocity) or a CLV (Constant Linear Velocity).

The optical pickup 7 for applying a light beam onto the optical disk 3 inserted in the cartridge holder 12 of the recording and/or reproducing apparatus 1 has a pickup base 34 formed of a substantially rectangular casing. The pickup base 34 includes at least a light source such as a semiconductor laser (not shown), an objective lens 35 for converging and applying the light beam from the light source onto the signal-recording surface of the optical disk 3, a photodetector (not shown) for detecting return light reflected by the signal-recording surface of the optical disk 3, and a driver for driving the objective lens 35 in the focusing direction or tracking direction of the optical disk 3. A through hole 36 through which a first guide shaft 22a, which will be described later, extends is formed at one end 34a in the longitudinal direction of the pickup base 34, and an engaging piece 37 to be engaged with a second guide shaft 22b, which will be described later, is formed at the other end 34b.

The optical pickup 7 is supported by the first and second guide shafts 22a and 22b arranged at the opposing side edges of the rectangular aperture 23 formed in the lower surface 20a of the chassis base 20, and thereby faces the upper surface 20b of the chassis base 20 through the rectangular aperture 23. The objective lens 35 opposes the signal-recording surface of the optical disk 3.

A magnetic head device 40 is attached to the optical pickup 7 with a connecting arm 38 and a head arm 39 therebetween. A base end of the connecting arm 38 is attached to the pickup base 34, and a leading end thereof extends in the rear of the rear edge of the chassis base 20 and is bent upward. A base end of the head arm 39 is turnably attached to the leading end of the connecting arm 38.

The magnetic head device 40 is mounted at the leading end of the head arm 39 with a gimbal spring therebetween so that it points downward and opposes the objective lens 35 mounted on the pickup base 34 of the optical pickup 7.

Since a pair of guide shafts 22a and 22b provided on the bottom surface 20a of the chassis 20 to guide the movement of the optical pickup 7 are arranged at the opposing side edges of the rectangular aperture 23, they support the optical pickup 7 so that the optical pickup 7 can move in the radial direction of the optical disk 3.

The first guide shaft 22a extends through the through hole 36 formed at one end of the pickup base 34 of the optical pickup 7. The engaging piece 37 formed at the other end of the pickup base 34 is movably engaged with the second guide shaft 22b. With these structures, the guide shafts 22a and 22b guide the optical pickup 7 moving in the radial direction of the optical disk 3.

The first guide shaft 22a has a thread groove, and extends through the through hole 36 of the optical pickup 7 having a groove to be screwed to the thread groove. Accordingly, in the recording and/or reproducing apparatus 1, the optical pickup 7 can be moved along the guide shafts 22a and 22b by rotating the first guide shaft 22a by a pickup driver (not shown).

Alternatively, the optical pickup 7 may be conveyed in the radial direction of the optical disk 3 by rotating, by the pickup driver, a lead screw that is placed in the radial direction of the optical disk 3 and that is engaged with one end of the optical pickup 7.

The cartridge holder 12 for holding the optical disk 3 is placed on the chassis 11 above the optical pickup 7 and below the magnetic head device 40. As shown in FIG. 3, the cartridge holder 12 is shaped like a thin rectangular casing that is open at a front end and that has a size substantially equal to that of the disk cartridge 4. The disk cartridge 4 in which the optical disk 3 is rotatably stored is inserted into the cartridge holder 12 from the open front end.

The cartridge holder 12 includes a pair of right and left guide portions 42 for guiding the insertion of the disk cartridge 4, and a top plate 43 extending between the guide portions 42. The guide portions 42 and the top plate 43 constitute a cartridge-holding portion 44 for holding the disk cartridge 4. The guide portions 42 are substantially L-shaped in cross section and extend in the inserting direction of the disk cartridge 4. The top plate 43 has a substantially rectangular aperture 43a corresponding to the magnet-head aperture 4a of the disk cartridge 4. When the disk cartridge 4 is inserted into the cartridge-holding portion 44, the cartridge holder 12 opens the shutter member 8 of the disk cartridge 4 to cause the magnetic-head aperture 4a and the optical-pickup aperture 4b to be exposed to the outside. Consequently, a part of the signal-recording surface of the optical disk 3 faces the magnetic head device 40 through the magnetic-head aperture 4a and the aperture 43a of the top plate 43. When recording on the optical disk 3 is performed, the head arm 39 is turned, the magnetic head device 40 moves closer to or into contact with the optical disk 3 through the aperture 4a.

The guide portions 42 have engaging projections 46 and 47 to be slidably engaged with guide grooves formed in the guide plate 51 and the slider 50 which will be described later. The cartridge holder 12 is moved closer to and away from the chassis base 20 while the engaging projections 46 and 47 are guided by the guide plate 51 and the slider 50.

When the disk cartridge 4 is inserted and is moved into a loading position close to the chassis base 20, the optical disk 3 is placed on the disk table 30 of the disk-rotating mechanism 6 placed on the chassis base 20. In this case, the disk cartridge 4 is positioned by the positioning projections 24 projecting on the chassis base 20. In a state in which the optical disk 3 is placed on the disk table 30, the objective lens 35 of the optical pickup 7 faces the signal-recording surface of the optical disk 3 through the open optical-pickup aperture 4b.

The loading mechanism 5 for loading and unloading the disk cartridge 4 by moving the chassis 11 and the cartridge holder 12 closer to and away from each other includes a slider 50 and a guide plate 51 with which the engaging projections 27 and 28 projecting on the chassis base 20 and the engaging projections 46 and 47 projecting on the cartridge holder 12 are engaged.

As shown in FIG. 3, the slider 50 includes both side plates 58 and 59 having guide grooves 53 to 56 to be engaged with the engaging projections 27 and 28 of the chassis base 20 or the engaging projections 46 and 47 of the cartridge holder 12, and a connecting portion 60 formed by substantially bending the side plates 58 and 59 at their upper ends.

The side plates 58 and 59 have first and second guide grooves 53 and 54 formed adjacent to one-end portions 58a and 59a in the longitudinal direction, and third and fourth guide grooves 55 and 56 formed at almost the center points in the longitudinal direction.

The first and third guide grooves 53 and 55 serve to guide the movement of the cartridge holder 12. The first and third guide grooves 53 and 55 have first horizontal guide portions 53a and 55a horizontally formed from one-end portions 58a and 59a in the longitudinal direction of the side plates 58 and 59 toward the other-end portions 58b and 59b, inclined guide portions 53b and 55b connected to the first horizontal guide portions 53a and 55a and inclined toward the upper sides of the side plates 58 and 59, and second horizontal guide portions 53c and 55c connected to the inclined guide portions 53b and 55b and horizontally formed toward the other-end portions 58b and 59b in the longitudinal direction of the side plates 58 and 59. The engaging projections 46 projecting on the cartridge holder 12 are engaged with the first guide grooves 53, and the engaging projections 47 projecting on-the cartridge holder 12 are engaged with the third guide grooves 55.

The second and fourth guide grooves 54 and 56 serve to guide the movement of the chassis base 20. The second and fourth guide grooves 54 ad 56 have first horizontal guide portions 54a and 56a horizontally formed from the one-end portions 58a and 59a in the longitudinal direction of the side plates 58 and 59 toward the other-end portions 58b and 59b, inclined guide portions 54b and 56b connected to the first horizontal guide portions 54a and 56a and inclined toward the lower sides of the side plates 58 and 59, and second horizontal guide portions 54c and 56c connected to the inclined guide portions 54b and 56b and horizontally formed toward the other-end portions 58b and 59b in the longitudinal direction of the side plates 58 and 59. The engaging projections 27 projecting on the chassis base 20 are engaged with the second guide grooves 54, and the engaging projections 28 projecting on the chassis base 20 are engaged with the fourth guide grooves 56.

The slider 50 has engaging projections 61 and 62 to be slidably engaged with guide grooves formed in the guide plate 51. The slider 50 is guided in the longitudinal direction of the side plates 58 and 59 while the engaging projections 61 and 62 slide in the guide grooves of the guide plate 51.

As shown in FIG. 3, the guide plate 51 for guiding the movement of the slider 50 has a pair of guide walls 63 and 64 that guide the movements of the slider 50, the cartridge holder 12, and the chassis base 20. The guide walls 63 and 64 are formed along the moving direction of the slider 50 corresponding to the side plates 58 and 59 of the slider 50. The guide walls 63 and 64 have horizontal guide grooves 65 to 68 for guiding the horizontal movement of the slider 50 and vertical guide grooves 69 and 70 for guiding the vertical movements of the cartridge holder 12 and the chassis base 20.

The horizontal guide grooves 65 to 68 for guiding the horizontal movement of the slider 50 are formed at one-end portions 63a and 64a and the other-end portions 63b and 64b in the longitudinal direction of the guide walls 63 and 64. The horizontal guide grooves 65 to 68 are substantially horizontal grooves having open ends close to the one-end portions 63a and 64a of the guide walls 63 and 64. A pair of engaging projections 61 and 62 projecting adjacent to both ends of the side plates 58 and 59 of the slider 50 are slidably engaged with the horizontal guide grooves 65 to 68. Therefore, the guide plate 51 allows the slider 50 to reliably move in the horizontal direction.

The vertical guide grooves 69 and 70 for guiding the vertical movements of the cartridge holder 12 and the chassis base 20 are formed at the one-end portions 63a and 64a in the longitudinal direction of the guide walls 63 and 64. The vertical guide grooves 69 and 70 are substantially vertical grooves each having an open upper end. The engaging projections 27 and the engaging projections 46 projecting on the cartridge holder 12 and the chassis base 20 are slidably engaged with the vertical guide grooves 69 and 70. Therefore, the guide plate 51 allows the cartridge holder 12 and the chassis base 20 to move in the vertical direction.

The vertical guide grooves 69 and 70 are narrower on the lower sides than on the upper sides serving as the open sides. The wide engaging projections 46 of the cartridge holder 12 are engaged with the upper sides of the vertical guide grooves 69 and 70, and the narrow engaging projections 27 of the chassis base 20 are engaged with the lower sides thereof. Therefore, even when the cartridge holder 12 is moved down toward the chassis base 20, it can be prevented from moving closer to the chassis base 20 than necessary because the engaging projections 46 of the cartridge holder 12 will not reach the narrow lower sides.

Figure 4:
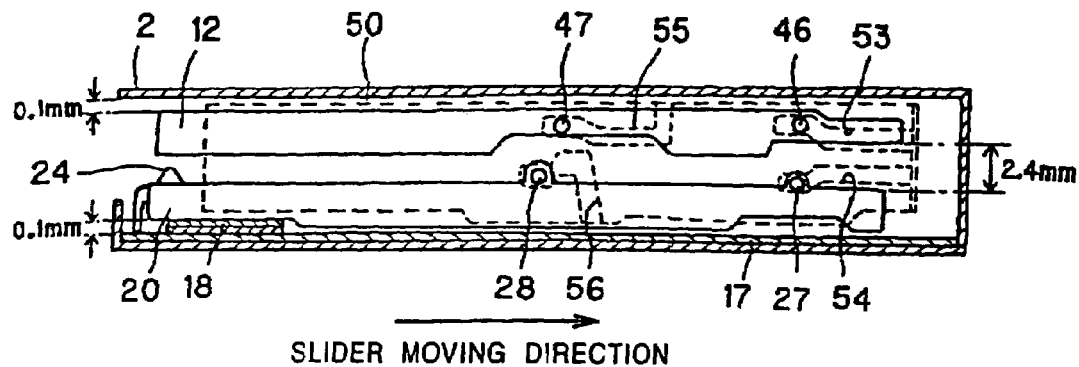
FIG. 4 is a cross-sectional view showing a state in which a cartridge holder and a chassis base are separate from each other.
Figure 5:
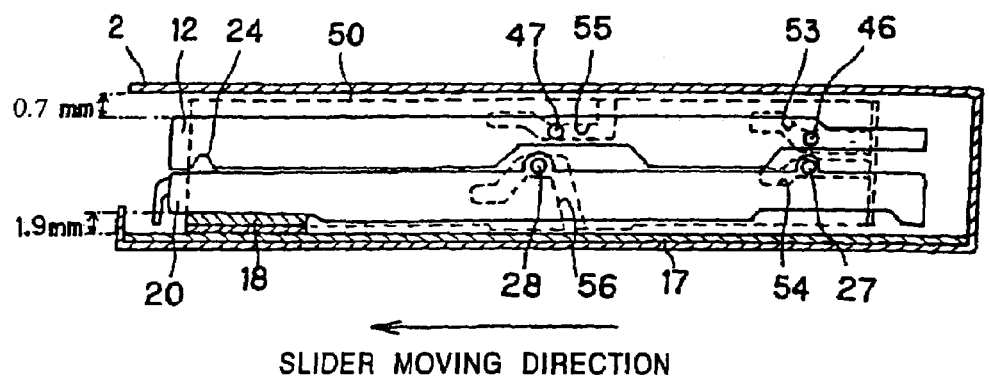
FIG. 5 is a cross-sectional view showing a state in which the cartridge holder and the chassis base are close to each other.

In the above recording and/or reproducing apparatus 1, the cartridge holder 12 is placed on the upper surface 20b of the chassis base 20, and the slider 50 is engaged the chassis base 20 from above the cartridge holder 12. In this case, as shown in FIGS. 4 and 5, the engaging projections 46 and 47 projecting on the guide portions 42 of the cartridge holder 12 are slidably engaged with the guide grooves 53 and 55 formed in the side plates 58 and 59 of the slider 50. The engaging projections 27 and 28 projecting on both side edges of the chassis base 20 are engaged with the guide grooves 54 and 56 formed in the side plates 58 and 59.

The guide plate 51 is placed below the chassis base 20. The guide walls 63 and 64 of the guide plate 51 are positioned outside the side plates 58 and 59 of the slider 50, and the engaging projections 61 and 62 projecting on both ends of the side plates 58 and 59 are slidably engaged with the horizontal guide portions 65 to 68. The engaging projections 46 projecting on the guide portions 42 of the cartridge holder 12 and the engaging projections 27 projecting on both side edges of the chassis base 20 are slidably engaged with the vertical guide portions 69 and 70 of the guide plate 51.

In such a loading mechanism 5 that constitutes the apparatus body, the slider 50 is moved in the direction of arrow D in FIG. 3 toward the one-end portions 58a and 59a in the longitudinal direction of the side plates 58 and 59 or in the opposite direction toward the other-end portions 58b and 59b by a carriage mechanism including a loading motor, a gear mechanism, and so on, although the mechanism is not described in detail.

When the slider 50 is moved in the direction of arrow D in FIG. 3, the engaging projections 27, 28, 46, and 47 of the chassis base 20 and the cartridge holder 12 engaged with the guide groves 53 to 56 are slid therein from the one-end portions 58a and 59a in the longitudinal direction of the side plates 58 and 59 toward the other-end portions 58b and 59b. Consequently, the engaging projections 46 and 47 slide from the first horizontal guide portions 53a and 55a of the first and third guide grooves 53 and 55 to the second horizontal guide portions 53c and 55c through the inclined guide portions 53b and 55b, and the cartridge holder 12 is moved away from the chassis 11. In this case, since the vertical movement of the engaging projections 46 is guided by the vertical guide grooves 69 and 70 formed in the guide walls 63 and 64 of the guide plate 51, the cartridge holder 12 is moved only upward along the vertical guide grooves 69 and 70, and is reliably separated above the chassis base 20 without being displaced in the moving direction of the slider 50.

The engaging projections 27 and 28 of the chassis 11 slide from the first horizontal guide portions 54a and 56a of the second and fourth guide grooves 54 and 56 to the second horizontal guide portions 54c and 56c through the inclined guide portions 54b and 56b, and the chassis 11 is moved away from the cartridge holder 12. In this case, since the vertical movement of the engaging projections 27 is guided by the vertical guide grooves 69 and 70 formed in the guide walls 63 and 64 of the guide plate 51, the chassis base 20 is moved only downward along the vertical guide grooves 69 and 70, and is reliably separated below the cartridge holder 12 without being displaced in the moving direction of the slider 50.

Conversely, when the slider 50 is moved in the direction opposite to the direction of arrow D in FIG. 3, it slides the engaging projections 27, 28, 46, and 47 of the chassis base 20 and the cartridge holder 12 in the guide grooves 53 to 56 from the other-end portions 58b and 59b in the longitudinal direction of the side plates 58 and 59 toward the one-end portions 58a and 59a. Consequently, the engaging projections 46 and 47 are slid from the second horizontal guide portions 53c and 55c of the first and third guide grooves 53 and 55 to the first horizontal guide portions 53a and 55a through the inclined guide portions 53b and 55b, and the cartridge holder 12 is moved closer to the chassis 11. In this case, since the vertical movement of the engaging projections 46 is guided by the vertical guide grooves 69 and 70 formed in the guide walls 63 and 64 of the guide plate 51, the cartridge holder 12 is moved only downward along the vertical guide grooves 69 and 70 and is reliably moved closer to the chassis base 20 without being displaced in the moving direction of the slider 50.

The engaging projections 27 and 28 of the chassis base 20 are slid from the second horizontal guide portions 54c and 56c of the second and fourth guide grooves 54 and 56 to the first horizontal guide portions 54a and 56a through the inclined guide portions 54b and 56b, and the chassis 11 is moved closer to the cartridge holder 12. In this case, since the vertical movement of the engaging projections 27 is guided by the vertical guide grooves 69 and 70 formed in the guide walls 63 and 64 of the guide plate 51, the chassis base 20 is moved only upward along the vertical guide grooves 69 and 70 and is reliably moved closer to the cartridge holder 12 without being displaced in the moving direction of the slider 50.

By moving the cartridge holder 12 and the chassis base 20 closer to each other, the loading mechanism 5 places the disk cartridge 4 put in the cartridge holder 12 onto the disk table 30 of the disk rotating mechanism 6 placed on the chassis base 20 so that the disk cartridge 12 can rotate. By moving the cartridge holder 12 and the chassis base 20 away from each other, the loading mechanism 5 carries the disk cartridge 4 put in the cartridge holder 12 to an unloading position where the disk cartridge 4 can be ejected outside the outer housing 2.

In the recording and/or reproducing apparatus 1 having the above-described configuration, a unit including the cartridge holder 12, the chassis base 20, the slider 50, and the guide plate 51 is mounted in the outer housing 2. As shown in FIGS. 1 and 3, the circuit board 17 is placed inside the outer housing 2. Various electronic components, such as a controller for controlling the drivers of the recording and/or reproducing apparatus 1, are mounted on the lower surface of the circuit board 17. The circuit board 17 is connected to one end of the flexible circuit board 18 that is electrically connected to the pickup base 34 of the optical pickup 7 placed on the lower surface 20*a* of the chassis base 20.

A clearance between the pickup base 34 and the circuit board 17 placed on the lower surface of the outer housing 2 is approximately 0.1 mm when the chassis base 20 is moved down away from the cartridge holder 12, as shown in FIG. 4, and is approximately 1.9 mm when the chassis base 20 is moved up closer to the cartridge holder 12, as shown in FIG. 5. That is, the chassis base 20 is vertically moved by approximately 1.8 mm by the loading mechanism 5.

When the disk cartridge 4 is loaded and an information signal is recorded on the signal-recording surface of the optical disk 3 or is reproduced from the surface, the chassis base 20 is moved up closer to the cartridge holder 12. Therefore, a clearance of approximately 1.9 mm is formed between the optical pickup 7 and the circuit board 17 placed on the lower surface of the outer housing 2. This clearance allows the flexible circuit board 18 for driving the optical pickup 7 to be moved smoothly.

When an information signal is not recorded on the optical disk 3 or is not reproduced therefrom, the chassis base 20 is moved down away from the cartridge holder 12. In this case, a clearance of 0.1 mm is formed between the optical pickup 7 and the circuit board 17 placed on the lower surface of the outer housing 2. The optical pickup 7 is not driven, and this clearance is sufficient to store the flexible circuit board 18.

Since the chassis base 20 having the optical pickup 7 is moved together with the cartridge holder 12, in a state in which the optical pickup 7 is not moved in the radial direction of the optical disk 3, the clearance between the optical pickup 7 and the lower surface of the outer housing 2 can be limited to the height required to store the flexible circuit board 18. In an apparatus in which only the cartridge holder is vertically moved and the base chassis with the optical pickup is fixed, it is constantly necessary to ensure a clearance sufficient for the movement of the flexible circuit board between the optical pickup and the lower surface of the outer housing. In contrast, according to the present invention, since it is only necessary to ensure a clearance required to store the flexible circuit board 18, the height, that is, thickness of the outer housing 2 is reduced.

The clearance between the upper surface 2*b* of the outer housing 2 and the cartridge holder 12 is approximately 0.1 mm when the cartridge holder 12 is moved up away from the chassis base 20, as shown in FIG. 4, and is approximately 0.7 mm when the cartridge holder 12 is moved down closer to the chassis base 20, as shown in FIG. 5. That is, the cartridge holder 12 is vertically moved by approximately 0.6 mm by the loading mechanism 5.

When the disk cartridge 4 is loaded and an information signal is recorded on the signal-recording surface of the optical disk 3 or is reproduced from the surface, since the cartridge holder 12 is moved down closer to the chassis base 20, a clearance of approximately 0.7 mm is formed between the cartridge holder 12 and the upper surface 2*b* of the outer housing 2. This clearance is sufficient to operate the magnetic head device 40 overhanging the upper surface of the cartridge holder 12. When an information signal is not recorded on the optical disk 3 or is not reproduced therefrom, the cartridge holder 12 is moved up away from the chassis base 20. In this case, a clearance of 0.1 mm is formed between the magnetic head device 40 and the upper surface 2*b* of the outer housing 2. The magnetic head device 40 is not operated, and this clearance is sufficient to store the magnetic head device 40.

In a state in which the disk cartridge 4 is not loaded in the cartridge holder 12, the slider 50 of the loading mechanism 5 is moved in the direction of arrow D in FIG. 3. Therefore, the engaging projections 27, 28, 46, and 47 of the chassis base 20 and the cartridge holder 12 are guided by the guide grooves 53 to 56 formed in the side plates 58 and 59 of the slider 50, and the cartridge holder 12 and the chassis base 20 are separate from each other. The cartridge holder 12 is positioned at a height substantially equal to the position of the opening 13 formed in the front face 2*a* of the outer housing 2 through which the disk cartridge 4 is inserted, so that the insertion of the disk cartridge 4 is permitted.

In this case, the clearance between the cartridge holder 12 and the upper surface 2*b* of the outer housing 2 is approximately 0.1 mm, and the magnetic head device 40 overhanging the cartridge holder 12 is placed inside the clearance. The clearance between the chassis base 20 and the lower surface of the outer housing 2 is 0.1 mm, and the flexible circuit board 18 electrically connected to the optical pickup 7 on the chassis base 20 is stored in the clearance.

When the disk cartridge 4 is inserted from the opening 13, the insertion is detected by a cartridge-detecting switch (not shown). In response to a control signal from the controller, the slider 50 of the loading mechanism 50 is moved by approximately 4 mm in the direction opposite to the direction of arrow D in FIG. 3 by a driving mechanism (not shown). In this case, since the engaging projections 61 and 62 formed on the side plates 58 and 59 are guided by the horizontal guide grooves 65 to 68 of the guide plate 51, the slider 50 is reliably moved in the horizontal direction. With the movement of the slider 50, the engaging projections 27, 28, 46, and 47 of the chassis base 20 and the cartridge holder 12 are guided by the guide grooves 53 to 56 formed in the side plates 58 and 59 of the slider 50, and the cartridge holder 12 and the chassis base 20 are moved closer to each other. In this case, since the engaging projections 27 and 46 are guided by the vertical guide grooves 69 and 70 of the guide plate 51, the cartridge holder 12 and the chassis base 20 are reliably moved in the vertical direction.

The cartridge holder 12 is moved by approximately 0.6 mm toward the chassis base 20 by the loading mechanism 5, and the chassis base 20 is moved by approximately 1.8 mm toward the cartridge holder 12. In the state in which the cartridge holder 12 and the chassis base 20 are close to each other, a clearance of 0.7 mm is formed between the upper surface 2*b* of the outer housing 2 and the cartridge holder 12, and a clearance of 1.9 mm is formed between the lower surface of the outer housing 2 and the optical pickup 7 placed on the lower surface 20a of the chassis base 20.

Therefore, the flexible circuit board 18 that connects the optical pickup 7 and the circuit board 17 placed on the lower surface of the outer housing 2 can be smoothly driven in conjunction with the movement of the pickup base 34. Moreover, the magnetic head device 40 can be smoothly driven in conjunction with the movement of the pickup base 34.

When the cartridge holder 12 and the chassis base 20 are closer to each other, the disk cartridge 4 inserted in the cartridge holder 12 is placed on the upper surface 20b of the chassis base 20. The optical disk 3 is centered about the chucking hole 3a by the frusto-conical projection formed on the upper surface of the disk table 30 of the disk rotating mechanism 6, the chucking plate 3b is attracted by the magnet provided on the disk table 30, so that the optical disk 3 is rotatably held on the disk table 30.

Subsequently, the spindle motor 29 for rotating the disk table 30 is rotated, and information signals are recorded on or reproduced from the rotating optical disk 3.

In order to eject the disk cartridge 4 after the recording or reproduction of the information signals on or from the optical disk 3 is completed, the slider 50 is moved by approximately 4 mm in the direction of arrow D in FIG. 3 by the unshown driving mechanism. Consequently, the engaging projections 27, 28, 46, and 47 of the chassis base 20 and the cartridge holder 12 are guided by the guide grooves 53 to 56 formed in the side plates 58 and 59 of the slider 50, and the cartridge holder 12 and the chassis base 20 are separated from each other. The cartridge holder 12 is positioned at a height substantially equal to the position of the opening 13 serving as the insertion slot for the disk cartridge 4 formed in the front face 2a of the outer housing 2, and the disk cartridge 4 is ejected out of the outer housing 2 by an ejection mechanism whose detailed description is omitted.

In this case, a clearance of approximately 0.1 mm is formed between the cartridge holder 12 and the upper surface 2b of the outer housing 2, and a clearance of approximately 0.1 mm is formed between the chassis base 20 and the lower surface of the outer housing 2. Therefore, the magnetic head device 40 overhanging the cartridge holder 12, and the flexible circuit board 18 that connects the circuit board 17 and the optical pickup 7 can be stored in these clearances.

In such a recording and/or reproducing apparatus 1 to which the present invention is applied, since the chassis base 20 on which the optical pickup 7 is placed is moved together with the cartridge holder 12, in a state in which the optical pickup 7 is not moved in the radial direction of the optical disk 3, the clearance between the optical pickup 7 and the lower surface of the outer housing 2 can be limited to a clearance required to store the flexible circuit board 18. In the apparatus in which only the cartridge holder is vertically moved and the base chassis with the optical pickup is fixed, it is constantly necessary to ensure a clearance sufficient for the movement of the flexible circuit board between the optical pickup and the lower surface of the outer housing. In contrast, according to the present invention, since it is only necessary to ensure a clearance required to store the flexible circuit board 18, the height, that is, thickness of the outer housing 2 can be reduced.

Since the chassis base 20 on which the optical pickup 7 is placed is moved together with the cartridge holder 12, the loading time is shorter than in the apparatus in which only the cartridge holder vertically moves and the base chassis is fixed.

Before the disk cartridge 4 is completely inserted into the cartridge holding section 44 of the cartridge holder 12, the cartridge holder 12 may start to be guided toward the chassis base 20. This allows the cartridge holder 12 to be more speedily guided to the loading position.

Since the cartridge holder 12 and the chassis base 20 can be moved closer to and away from each other by sliding the single slider 50, the number of components can be made smaller than in the loading mechanism that separately moves the cartridge holder 12 and the chassis base 20.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording and/or reproducing apparatus comprising:
   a holder disposed at a predetermined distance from an upper surface of a housing to hold an inserted recording medium;
   a recording and/or reproducing section configured to perform recording on or reproduction from the recording medium;
   a chassis which is disposed at a predetermined distance from a lower surface of the housing and in which the recording and/or reproducing section is provided; and
   a loading mechanism that moves the holder and the chassis closer to each other in a first direction by separating the holder from the upper surface of the housing and separating the chassis from the lower surface of the housing, a clearance between the upper surface and the holder faced with the upper surface is smaller than a clearance between the lower surface and the chassis faced with the lower surface, when the recording medium is inserted in the holder.

2. A recording and/or reproducing apparatus according to claim 1, wherein the recording and/or reproducing section has a head for performing the recording on or reproduction from the recording medium, and the apparatus further comprises: a circuit board fixed inside the apparatus; and a flexible circuit board that is connected to the head at one end thereof, and to the circuit board at the other end thereof,
   wherein the circuit board and a flexible circuit are fixed between the lower surface and the chassis.

3. A recording and/or reproducing apparatus according to claim 2 wherein the circuit board is placed on a lower surface of the chassis inside a main body of the apparatus.

4. A recording and/or reproducing apparatus according to claim 2 wherein the head is provided in the chassis to be movable in the radial direction of the recording medium.

5. A recording and/or reproducing apparatus according to claim 2 wherein the head includes an optical pickup disposed on one side of the recording medium, and a magnetic head opposing the optical pickup with the recording medium therebetween.

6. A recording and/or reproducing apparatus according to claim 1, wherein the holder and the chassis are moved in the first direction to load the recording medium held in the holder into the recording and/or reproducing section.

7. A recording and/or reproducing apparatus according to claim 1, wherein the holder and the chassis are moved away from each other in a second direction by the loading mechanism to eject the recording medium.

8. A recording and/or reproducing apparatus according to claim 7, wherein the loading mechanism includes a slider movably provided in a main body of the apparatus to move the holder and the chassis in the first direction or the second direction, and a driver for driving the slider.

9. A recording and/or reproducing apparatus according to claim 8 wherein the slider includes a first operating portion for moving the holder in the first direction or the second direction, and a second operating portion for moving the chassis in the first direction or the second direction.

10. A recording and/or reproducing apparatus according to claim 1, wherein the recording and/or reproducing section has a head configured to perform the recording on or reproduction from the recording medium, and the apparatus further comprises:

a circuit board fixed inside the apparatus; and a flexible circuit board that is connected to the head at one end thereof, and to the circuit board at the other end thereof.

11. A recording and/or reproducing apparatus according to claim 10 wherein the circuit board is placed on a lower surface of the chassis inside a main body of the apparatus.

12. A recording and/or reproducing apparatus according to claim 10 wherein the head is provided in the chassis to be movable in the radial direction of the recording medium.

13. A recording and/or reproducing apparatus according to claim 10, wherein the head includes an optical pickup placed on one side of the recording medium, and a magnetic head opposing the optical pickup with the recording medium therebetween.

14. A recording and/or reproducing apparatus according to claim 1, wherein the housing has an opening and the holder is positioned at a height equal to the position of the opening.

* * * * *